United States Patent
Lee et al.

(10) Patent No.: US 12,292,773 B2
(45) Date of Patent: May 6, 2025

(54) ELECTRONIC DEVICE COMPRISING CONNECTOR

(71) Applicant: SAMSUNG ELECTRONICS CO., LTD., Suwon-si (KR)

(72) Inventors: Wookwang Lee, Suwon-si (KR); Kwanhoe Ku, Suwon-si (KR); Kyounghoon Kim, Suwon-si (KR); Sukgyong Kim, Suwon-si (KR); Dongrak Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/135,886

(22) Filed: Apr. 18, 2023

(65) Prior Publication Data
US 2023/0259188 A1    Aug. 17, 2023

Related U.S. Application Data

(63) Continuation of application No. PCT/KR2021/017675, filed on Nov. 26, 2021.

(30) Foreign Application Priority Data

Nov. 26, 2020 (KR) .................. 10-2020-0161331

(51) Int. Cl.
*G06F 1/26* (2006.01)
*G06F 1/3296* (2019.01)
(Continued)

(52) U.S. Cl.
CPC ............ *G06F 1/266* (2013.01); *G06F 1/3296* (2013.01); *G06F 13/382* (2013.01);
(Continued)

(58) Field of Classification Search
CPC .......... G06F 1/189; G06F 1/263; G06F 1/266; G06F 13/382; G06F 13/4068;
(Continued)

(56) References Cited

U.S. PATENT DOCUMENTS 7,519,840 B2    4/2009   Lim et al.
8,412,861 B2    4/2013   Kim
(Continued)

FOREIGN PATENT DOCUMENTS

JP      2012-215993 A   11/2012
KR   10-2006-0092613 A    8/2006
(Continued)

OTHER PUBLICATIONS

"Universal Serial Bus Type-C Cable and Connector Specification". Release 2.0. Aug. 2019. USB 3.0 Promotor Group. (Year: 2019).*
(Continued)

*Primary Examiner* — Thomas J. Cleary
(74) *Attorney, Agent, or Firm* — Sughrue Mion, PLLC

(57) ABSTRACT

An electronic device includes: a power management module; a connector; a device recognition circuit; and a processor. The processor is configured to: based on a first resistance value detected in a first recognition pin, control the power management module to supply a first power signal to a first power pin and to supply a second power signal to a second recognition pin; receive first identification information of an external device via the first recognition pin or the first data pin; and based on the first identification information, control the power management module to cut off a supply of a first power signal and to maintain a supply of the second power signal.

15 Claims, 10 Drawing Sheets

(51) Int. Cl.
*G06F 13/38* (2006.01)
*G06F 13/40* (2006.01)
*G06F 13/42* (2006.01)
*H04R 1/10* (2006.01)

(52) U.S. Cl.
CPC ...... *G06F 13/4068* (2013.01); *G06F 13/4282* (2013.01); *H04R 1/1041* (2013.01); *G06F 2213/0042* (2013.01); *H04R 2420/09* (2013.01); *H04R 2460/03* (2013.01)

(58) Field of Classification Search
CPC ......... G06F 13/4282; G06F 2213/0042; G06F 1/1613; G06F 1/1626; G06F 1/3203; G06F 1/3209; G06F 1/3296; G06F 13/4081; H04R 1/1033; H04R 1/1041; H04R 2420/09; H04R 1/10; H04R 5/04; H04R 2420/05; H04R 2460/03; H02J 7/0036; H02J 7/00045; H02J 7/342; H02J 2207/30; Y02D 10/00
See application file for complete search history.

(56) References Cited

U.S. PATENT DOCUMENTS

| | | | |
|---|---|---|---|
| 8,626,932 | B2 | 1/2014 | Lydon et al. |
| 8,719,461 | B2 | 5/2014 | Kim |
| 9,047,073 | B2 | 6/2015 | Ozaki et al. |
| 9,201,827 | B2 | 12/2015 | Lydon et al. |
| 9,477,288 | B2 | 10/2016 | Yang |
| 9,996,130 | B2 | 6/2018 | Rhee |
| 10,108,242 | B2 | 10/2018 | Hong et al. |
| 10,176,140 | B2 | 1/2019 | Koyanagi |
| 10,204,062 | B2 | 2/2019 | Lee et al. |
| 10,261,934 | B2 | 4/2019 | Lim |
| 10,268,627 | B2 * | 4/2019 | Schnell ............... G06F 13/4022 |
| 10,445,266 | B2 | 10/2019 | Jo |
| 10,503,240 | B1 | 12/2019 | Bodnaruk et al. |
| 10,521,372 | B2 * | 12/2019 | Lee ....................... G06F 13/38 |
| 10,707,688 | B2 | 7/2020 | Kang |
| 10,769,093 | B2 | 9/2020 | Schnell et al. |
| 10,788,874 | B2 | 9/2020 | Lee et al. |
| 10,838,894 | B2 | 11/2020 | Jo |
| 10,901,487 | B2 | 1/2021 | Bodnaruk et al. |
| 10,922,251 | B2 | 2/2021 | Lee et al. |
| 11,055,238 | B2 | 7/2021 | Lee et al. |
| 11,068,041 | B2 | 7/2021 | Regupathy et al. |
| 11,100,038 | B2 | 8/2021 | Lim |
| 11,162,991 | B2 | 11/2021 | Lee et al. |
| 11,372,468 | B2 | 6/2022 | Bodnaruk et al. |
| 11,550,748 | B2 | 1/2023 | Lim |
| 2006/0190748 | A1 | 8/2006 | Lim et al. |
| 2011/0055407 | A1 | 3/2011 | Lydon et al. |
| 2012/0210023 | A1 | 8/2012 | Ozaki et al. |
| 2013/0166928 | A1 | 6/2013 | Yang |
| 2015/0008749 | A1 | 1/2015 | Rhee |
| 2015/0234770 | A1 | 8/2015 | Koyanagi |
| 2016/0336694 | A1 * | 11/2016 | Chang ................ G06F 13/4022 |
| 2016/0364360 | A1 * | 12/2016 | Lim ........................ H03M 1/12 |
| 2017/0102762 | A1 | 4/2017 | Hong et al. |
| 2017/0222459 | A1 | 8/2017 | Kang |
| 2017/0344098 | A1 * | 11/2017 | Abu Hilal ........... G06F 13/4022 |
| 2018/0027320 | A1 * | 1/2018 | Liu ......................... G10L 19/00 381/74 |
| 2018/0032450 | A1 | 2/2018 | Lee et al. |
| 2018/0060261 | A1 * | 3/2018 | Chhor ................. G06F 13/4282 |
| 2018/0356873 | A1 * | 12/2018 | Regupathy ............ G06F 1/3253 |
| 2019/0064900 | A1 | 2/2019 | Lee et al. |
| 2019/0131810 | A1 * | 5/2019 | Lim ........................ H02J 7/342 |
| 2019/0188180 | A1 | 6/2019 | Schnell et al. |
| 2019/0257869 | A1 * | 8/2019 | Lee ....................... H01R 9/2425 |
| 2019/0319446 | A1 * | 10/2019 | Mondal .................. H02H 3/087 |
| 2019/0354163 | A1 | 11/2019 | Bodnaruk et al. |
| 2020/0033924 | A1 * | 1/2020 | Waters ................ G06F 13/4068 |
| 2020/0151126 | A1 | 5/2020 | Lee et al. |
| 2020/0403433 | A1 | 12/2020 | Chung et al. |
| 2022/0013968 | A1 | 1/2022 | Lee et al. |
| 2022/0147130 | A1 * | 5/2022 | Kim ......................... G06F 1/263 |
| 2022/0166241 | A1 * | 5/2022 | Sung .................. H01R 13/6666 |
| 2023/0187947 | A1 * | 6/2023 | Munnangi ........... H02J 7/00034 320/137 |

FOREIGN PATENT DOCUMENTS

| | | |
|---|---|---|
| KR | 10-2006-0112053 A | 10/2006 |
| KR | 10-2008-0004878 A | 1/2008 |
| KR | 10-2010-0047967 A | 5/2010 |
| KR | 10-2013-0074055 A | 7/2013 |
| KR | 10-2015-0005030 A | 1/2015 |
| KR | 10-2017-0125652 A | 11/2017 |
| KR | 10-2018-0045416 A | 5/2018 |
| KR | 10-2018-0074370 A | 7/2018 |
| KR | 10-2019-0061858 A | 6/2019 |
| KR | 10-2020-0061748 A | 6/2020 |

OTHER PUBLICATIONS

"Universal Serial Bus Power Delivery Specification". Revision 3.0. Version 2.0. Aug. 29, 2019. USB 3.0 Promotor Group. (Year: 2019).*

International Search Report (PCT/ISA/210) issued Mar. 8, 2022 by the International Searching Authority in counterpart International Patent Application No. PCT/KR2021/017675.

Written Opinion (PCT/ISA/237) issued Mar. 8, 2022 by the International Searching Authority in counterpart International Patent Application No. PCT/KR2021/017675.

Communication issued Jan. 22, 2024 by European Patent Office in European Patent Application No. 21898689.1.

Communication issued on Oct. 11, 2024 from the Korean Intellectual Property Office for Korean Patent Application No. 10-2020-0161331.

Communication issued on Jan. 13, 2025 by the Indian Patent Office in corresponding IN Patent Application No. 202317032605.

* cited by examiner

ELECTRONIC DEVICE COMPRISING CONNECTOR

CROSS-REFERENCE TO RELATED APPLICATIONS

This application is a by-pass continuation application of International Application No. PCT/KR2021/017675, filed on Nov. 26, 2021, which is based on and claims priority to Korean Patent Application No. 10-2020-0161331, filed on Nov. 26, 2020, in the Korean Intellectual Property Office, the disclosures of which are incorporated by reference herein their entireties.

BACKGROUND

1. Field

The disclosure relates to an electronic device including a connector that may be connected to an external device and a method thereof.

2. Description of Related Art

An electronic device such as a smart phone or a tablet PC may perform various functions. For example, the electronic device may perform functions such as wireless communication, video recording, video playback, or music playback. The electronic device may be used while being connected to an accessory device wirelessly or in a wired manner. For example, the electronic device may be used while being connected to an earphone device via a connector.

The electronic device may include a connector (e.g., a Universal Serial Bus (USB) type-C connector) for charging the electronic device or connecting to an accessory device. The accessory device may be wiredly connected to the connector (e.g., the USB type-C connector) of the electronic device, and may receive a power signal and a data signal (e.g., a sound signal) from the electronic device. When the accessory device is an earphone device, the earphone device may output a sound through a speaker based on a sound signal received from the electronic device. For example, the earphone device may receive the sound signal as digital data of USB Audio Class (UAC) via a data pin (e.g., an USB Type-C D+/D− pin) and output the sound based on the sound signal.

When the earphone device is connected to the electronic device, current consumption of a battery may increase due to supply of a power signal. For example, the electronic device may boost a power signal (about 3.2V to about 4.5V) supplied from the battery to a power signal of about 5V and supply the power signal of about 5V to the earphone device. In this case, current consumption due to voltage boosting may increase and thus a battery discharge rate may increase.

SUMMARY

Provided are an electronic device that reduces current consumption based on recognition of an accessory device when the accessory device (such as an earphone device) is wiredly connected to a connector and a method thereof.

According to an aspect of the disclosure, an electronic device includes: a power management module configured to control a supply of a first power signal and a supply of a second power signal; a connector includes a first sub-pin array and a second sub-pin array; a device recognition circuit configured to detect whether an external device is connected to the connector; and a processor. The first sub-pin array includes a first power pin, a first data pin, and a first recognition pin. The second sub-pin array includes a second power pin, a second data pin, and a second recognition pin. The first recognition pin and the second recognition pin are connected to the device recognition circuit. The processor is configured to: based on a first resistance value detected in the first recognition pin, control the power management module to supply the first power signal to the first power pin and to supply the second power signal to the second recognition pin, receive first identification information of the external device via the first recognition pin or the first data pin, and based on the first identification information, control the power management module to cut off the supply of the first power signal and to maintain the supply of the second power signal.

According to another aspect of the disclosure, a method for supplying power from an electronic device to an external device, the method includes: detecting a first resistance value of the external device connected via a first recognition pin of a first sub-pin array of a connector of the electronic device; supplying a first power signal to a first power pin of the first sub-pin array and supplying a second power signal to a second recognition pin of a second sub-pin array of the connector; receiving first identification information of the external device via a first data pin of the first sub-pin array; determining whether the first identification information matches second identification information stored in a memory of the electronic device; and based on a determination that the first identification information and the second identification information match, cutting off a supply of the first power signal and maintaining a supply of the second power signal.

According to another aspect of the disclosure, an electronic device includes: a power management module configured to control a supply of a first power signal and a supply of a second power signal; a connector; and a processor that is configured to: based on a first resistance value detected in the connector, control the power management module to supply the first power signal to the connector and to supply the second power signal to the connector; receive first identification information of an external device via the connector; and based on the first identification information, control the power management module to cut off the supply of the first power signal and to maintain the supply of the second power signal.

When the electronic device according to one or more embodiments disclosed in the disclosure recognizes the accessory device of a specified manufacturer via a device recognition pin (e.g., a CC pin) or a data pin (a D+ pin, a D− pin) of the connector, the electronic device may supply a power signal of a lower voltage than that of a power signal supplied via a power pin (e.g., VBUS pin) to the accessory device using the device recognition pin (e.g., a CC pin). Thus, unnecessary current consumption (or power consumption) may be reduced.

The electronic device according to one or more embodiments disclosed in the disclosure may allow the accessory device from being free of a circuit for power delivery (PD) communication, thereby reducing a manufacturing cost of the accessory device.

BRIEF DESCRIPTION OF THE DRAWINGS

The above and other aspects, features, and advantages of certain embodiments of the disclosure will be more apparent from the following description taken in conjunction with the accompanying drawings, in which.

With regard to the description of the drawings, the same or similar reference numerals may be used for the same or similar elements.

DETAILED DESCRIPTION

Figure 1:
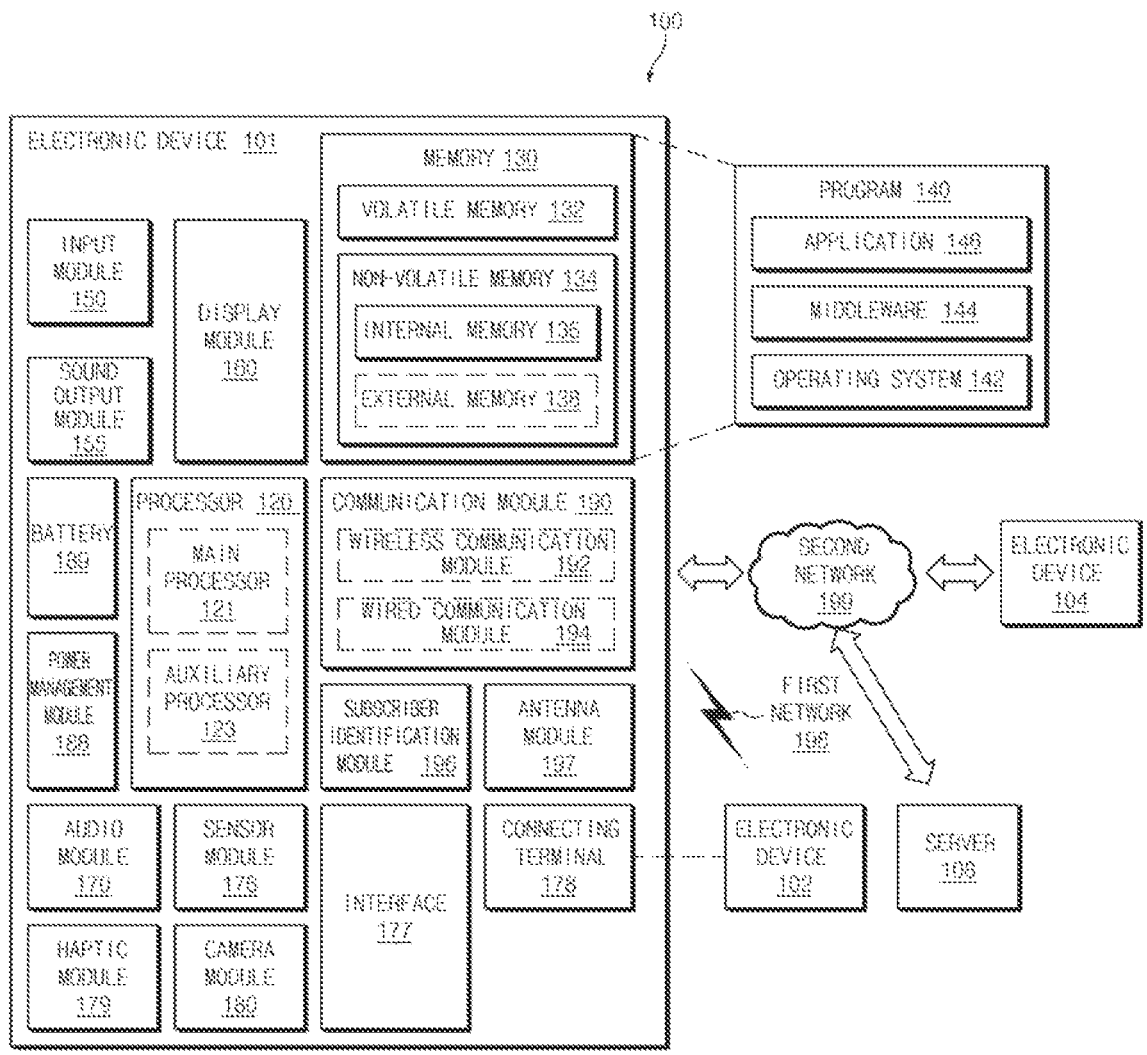
FIG. 1 is a block diagram of an electronic device in a network environment according to one or more embodiments.

Hereinafter, one or more embodiments of the disclosure are described with reference to the accompanying drawings. However, this is not intended to limit the disclosure as described in the disclosure to specific embodiments. It should be understood that the disclosure includes various modifications, equivalents, and/or alternatives of embodiments of the disclosure. In connection with the description of the drawings, like reference numerals may be used for like elements.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
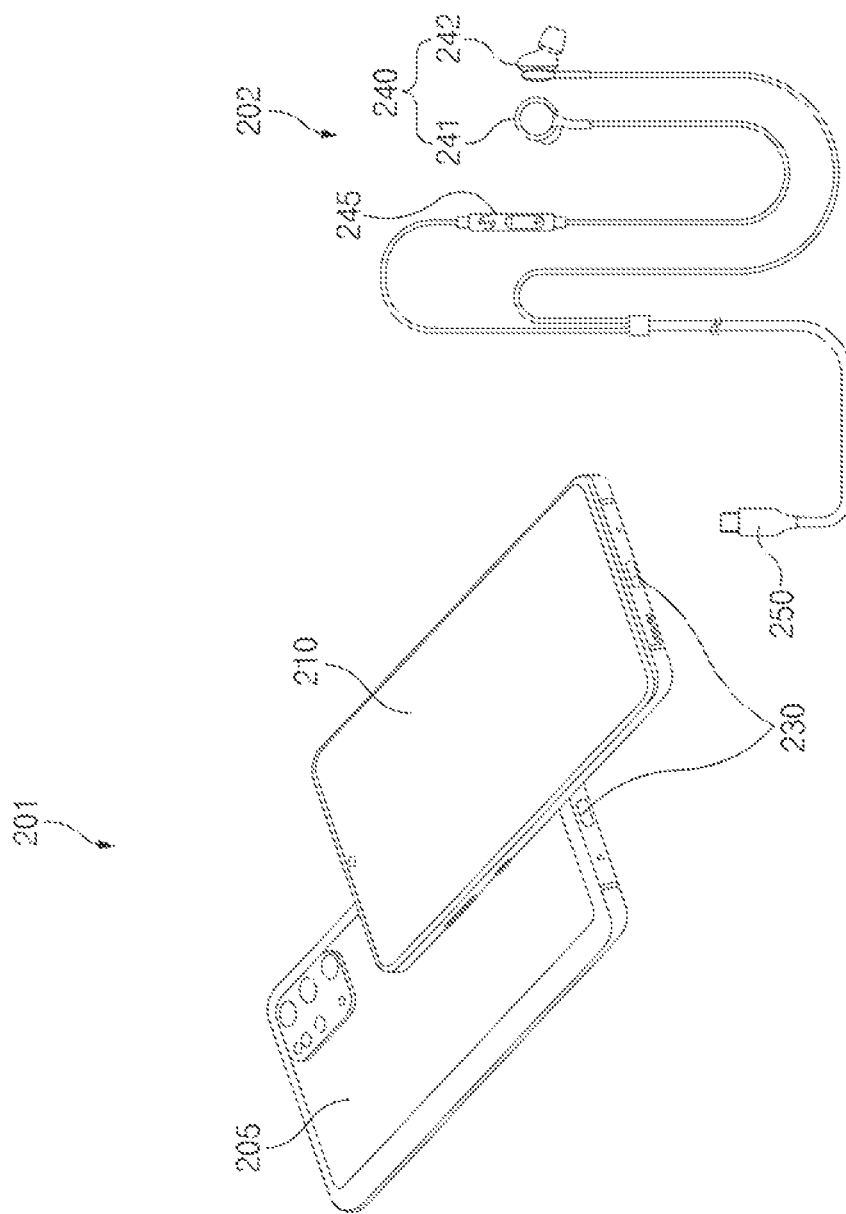
FIG. 2 shows an electronic device and an accessory device according to one or more embodiments.

FIG. 2 shows an electronic device and an accessory device according to one or more embodiments.

Referring to FIG. 2, an electronic device 201 (e.g., the electronic device 101 of FIG. 1) may include a body (or a housing) 205 and a display 210.

The display 210 and peripheral components (a camera, a physical button, and/or a sensor window) may be disposed in the body 205. The body 205 may include components necessary for operating the electronic device 201, such as a communication circuit, a processor, a memory, a printed circuit board, or a battery therein.

The display 210 may output image or text based content. For example, when a sound is output via an accessory device 202, the display 210 may output a user interface (e.g., a user interface of a music playback app or a video playback app) related to the output sound.

In one or more embodiments, the body 205 may have a first connector (or a receptacle) 230 mounted therein which is connected to the accessory device 202 (e.g., an earphone) and transmits and receives a power signal or a data signal. In one or more embodiments, the power signal may mean electrical power. For example, the body 205 may receive therein the first connector 230 for transmitting and receiving the electrical power and/or the data signal used by the accessory device 202 (e.g., the earphone).

The first connector 230 may be connected to a second connector (or a plug) 250 of the accessory device 202. The first connector 230 may include a plurality of pins for transmitting and receiving the power signal or the data signal. The plurality of pins included in the first connector 230 may contact pins included in the second connector 250 of the accessory device 202 to form a contact for transmitting and receiving the power signal or the data signal.

According to one or more embodiments, the first connector 230 may be a USB type-C connector specified in the USB standard. For example, the first connector 230 may be combined with the second connector 250 while a vertical insertion direction of the second connector 250 is not limited.

According to one or more embodiments, the first connector 230 may be a lightning connector or a thunderbolt connector. For example, the first connector 230 may supply power and/or signals to the second connector 250.

According to one or more embodiments, the electronic device 201 may supply the power signal to the accessory device 202 using at least one of a power pin (e.g., a VBUS pin) or a recognition pin (e.g., a CC1 pin or a CC2 pin) included in the first connector 230. The accessory device 202 may operate using the power signal provided via the power pin (e.g., a VBUS pin) or the recognition pin (e.g., a CC1 pin or a CC2 pin).

According to one embodiment, the electronic device 201 may transmit a first power signal via the power pin (e.g., a VBUS pin), and may supply a second power signal via the recognition pin (e.g., a CC1 pin or the CC2 pin). The first power signal may have a different voltage value (e.g., about 5V) from that (e.g., about 3.3V) of the second power signal.

According to one embodiment, when the second connector 250 of the accessory device 202 is connected to the first connector 230 of the electronic device 201, the electronic device 201 may supply the first power signal and the second power signal to the accessory device 202 at the same time, and may cut off one power signal thereof according to a specified condition to reduce current consumption (or power consumption). For example, the specified condition may be a condition related to identification information of the accessory device 202 (see FIG. 3 to FIG. 9).

According to an embodiment, the first connector 230 may include a first recognition pin (e.g., a CC1 pin) and a second recognition pin (e.g., a CC2 pin). One of the first recognition pin (e.g., a CC1 pin) and the second recognition pin (e.g., a CC2 pin) may be used to recognize the accessory device 202, and the other thereof may be used to provide the second power signal (about 3.3V) to the accessory device 202.

Hereinafter, a case in which the first recognition pin (e.g., a CC1 pin) is used to recognize the accessory device 202, and the second recognition pin (e.g., a CC2 pin) is used to provide the second power signal to the accessory device 202 will be described. However, the disclosure is not limited thereto. For example, the second recognition pin (e.g., a CC2 pin) may be used to recognize the accessory device 202, and the first recognition pin (e.g., a CC1 pin) may be used to provide the second power signal to the accessory device 202.

Additional information related to transmission or cutting off of the first power signal and the second power signal may be described with reference to FIG. 3 to FIG. 9.

The accessory device 202 may include a sound output device 240, a user interface (or a control module) 245, and the second connector (or the plug) 250. The sound output device 240 may include a first speaker 241 and a second speaker 242. The user interface (or control module) 245 may include buttons (e.g., a volume button, a call button) for user input, and may include a controller (e.g., a codec chip) therein. The second connector (or the plug) 250 may include a plurality of pins for transmitting and receiving the power signal or the data signal. The plurality of pins included in the second connector 250 may contact the pins included in the first connector 230 of the electronic device 201 to form a contact for transmitting and receiving the power signal or the data signal. Additional information about the second connector 250 may be provided with reference to FIG. 4.

Figure 3:
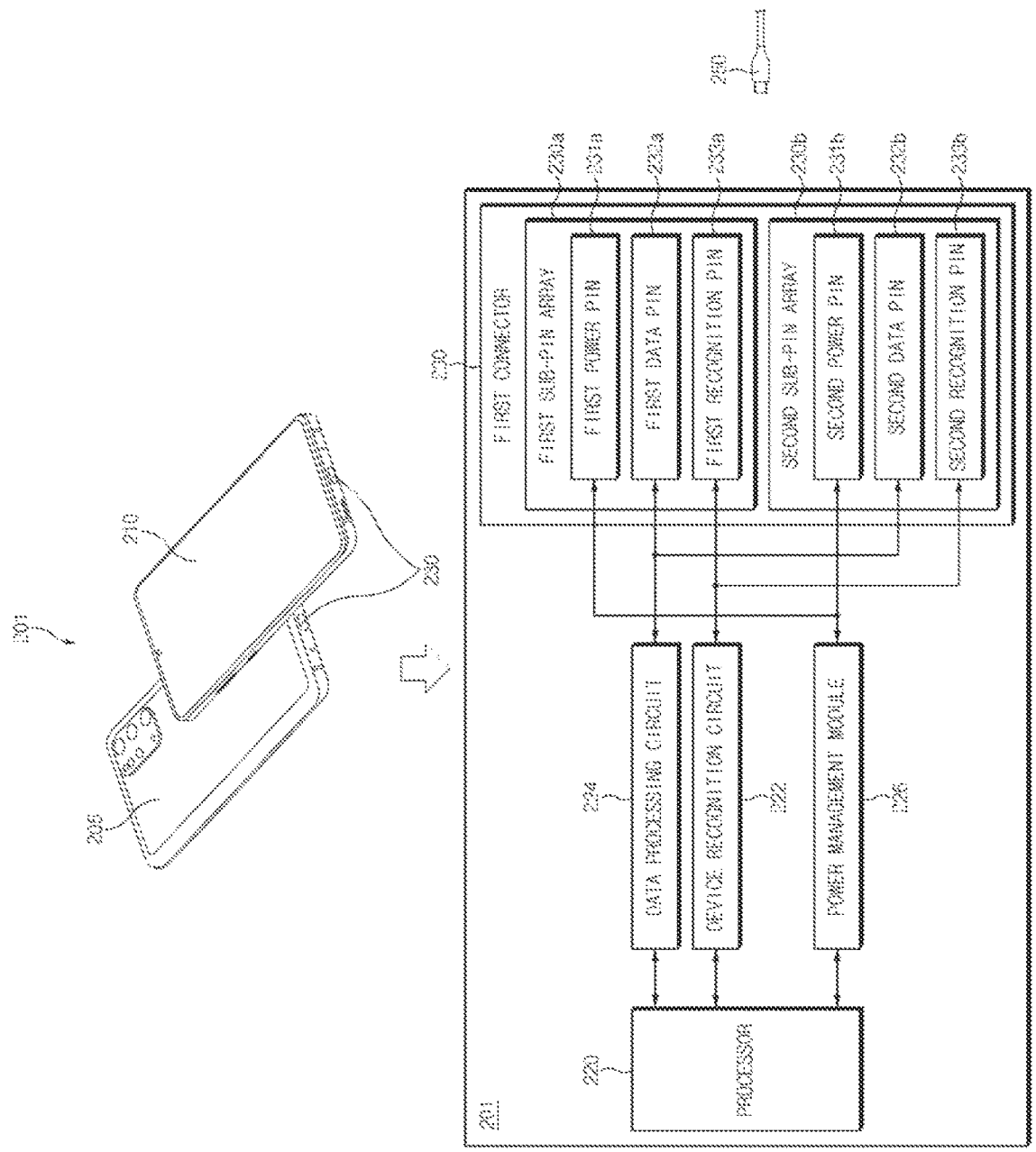
FIG. 3 is a block diagram of an electronic device according to one or more embodiments.

FIG. 3 is a block diagram of an electronic device according to one or more embodiments. In FIG. 3, components related to recognition or operation of the accessory device 202 are mainly shown. However, the disclosure is not limited thereto. Referring to FIG. 3, the first connector 230 may include a first sub-pin array 230a and a second sub-pin array 230b.

The first sub-pin array 230a may include a first power pin (e.g., a VBUS pin) (which may be a plurality of pins) 231a, a first data pin (e.g., a D+ pin, a D− pin) (which may be a plurality of pins) 232a, and a first recognition pin (e.g., a CC1 pin) 233a.

The second sub-pin array 230b may include a second power pin (e.g., a VBUS pin) (which may be a plurality of pins) 231b, a second data pin (e.g., a D+ pin, a D− pin) (which may be a plurality of pin) 232b, and a second recognition pin (e.g., a CC2 pin) 233b.

According to one or more embodiments, the electronic device 201 may include, as components for processing a signal transmitted and received via the first connector 230, a processor 220 (e.g., the processor 120 of FIG. 1), a device recognition circuit 222 (or a connection configuration module, e.g., a power delivery integrated circuit (PDIC)), and a data processing circuit (a data module) 224. The electronic device 201 may further include a power management module 226 (e.g., the power management module 188 in FIG. 1) that supplies the first power signal or the second power signal via the first connector 230.

According to one or more embodiments, the device recognition circuit 222 may be a device interface circuit. For example, the device recognition circuit 222 may be a USB interface circuit, a lightning interface circuit, or a thunderbolt interface circuit.

According to one or more embodiments, the processor 220 may execute computing or data processing related to control and/or communication of at least one further components of the electronic device 201. The processor 220 may process a signal received via the data processing circuit 224, and may control the device recognition circuit 222 or the power management module 226 in a specified communication scheme (e.g., i2c).

The device recognition circuit 222 (e.g., the power delivery integrated circuit (PDIC)) may recognize connection of an external device via a recognition pin (e.g., a configuration channel (CC) pin) 233a or 233b. According to one embodiment, the device recognition circuit 222 may be manufactured as a separate chip from the processor 220 or included in the processor 220.

According to one or more embodiments, the device recognition circuit 222 may send a discovery identity message to an external electronic device via the recognition pin (e.g., the configuration channel (CC) pin) 233a or 2333b of the first connector 230. The device recognition circuit 222 may perform functions of device connection detection, identification of a cable type, interface configuration, and vendor defined messages.

According to one or more embodiments, the device recognition circuit 222 may perform power delivery (PD) communication with the accessory device 202 according to a protocol specified in the USB Type-C standard. For example, when the accessory device 202 includes the power delivery integrated circuit (PDIC), the device recognition circuit 222 may transmit and receive a power delivery (PD) message to and from the accessory device 202. The PD message may be a communication protocol in a bi-phase marked code (BMC) scheme.

According to one or more embodiments, when the PD communication is available, the device recognition circuit 222 may receive identification information of the accessory device 202 via PD communication using the recognition pin (e.g., the CC (configuration channel) pin) 233a or 233b. For example, the device recognition circuit 222 may receive ID Header VDO via PD communication.

Figure 7:
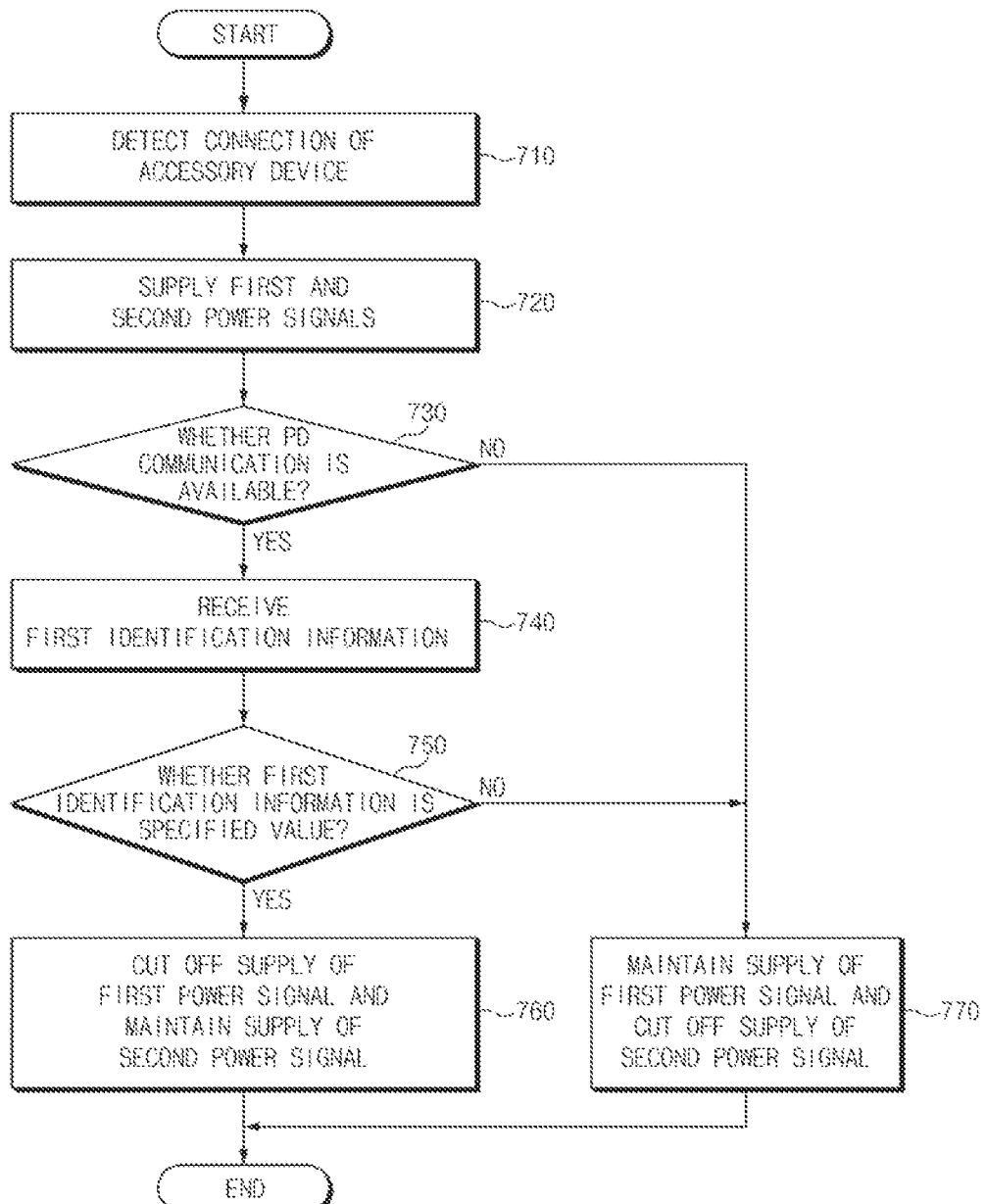
FIG. 7 is a flowchart of a power supply method using power delivery (PD) communication according to one or more embodiments.

According to one or more embodiments, when the identification information of the accessory device 202 received via the PD communication is a specified value (e.g., $V_{CONN}$-Powered USB Device (VPD)), the processor 220 or the device recognition circuit 222 may control the power management module 226 to block the first power signal and supply the second power signal to the accessory device 202 (see FIG. 7).

The data processing circuit 224 may transmit data according to the type of the accessory device 202 connected to the first connector 230. For example, the data processing circuit 224 may transmit data received from various communication circuits (e.g., a USB communication circuit, a Universal asynchronous receiver-transmitter (UART) communication circuit, an audio communication circuit, or a video communication circuit (e.g., HDMI, MHL)) inside the processor 130 according to the type of the accessory device 202 connected to the first connector 230 via the data pin 232a or 232b. According to one embodiment, the data processing circuit 224 may be manufactured as a separate chip from the processor 220 or included in the processor 220.

According to one or more embodiments, the data processing circuit 224 may receive identification information of the accessory device 202 using USB enumeration. For example, the identification information of the accessory device 202 may include at least some of manufacturer identification information (Vendor ID (VID)), product identification information (Product ID (PID)), manufacturing information (Manufacture info), or product information (Product info).

Figure 6A:
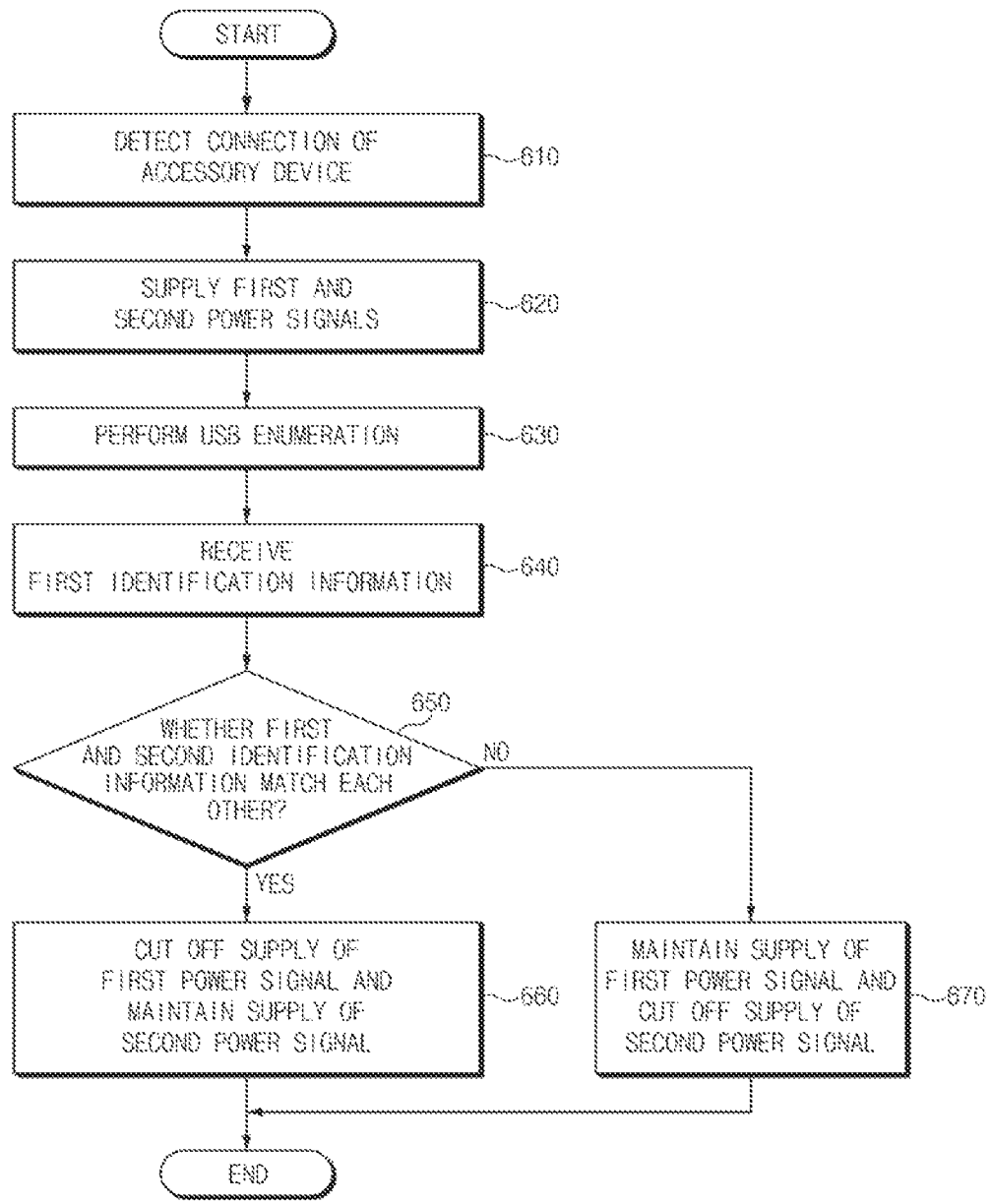
FIG. 6A is a flow chart of a power supply method using a data pin according to one or more embodiments.

According to one or more embodiments, when the identification information of the accessory device 202 received via the data pin 232a or 232b matches stored information, the processor 220 may control the power management module 226 to block the first power signal and supply the second power signal to the accessory device 202 (see FIG. 6A).

The power management module 226 may transmit the first power signal (e.g., about 5V) to at least one of the first power pin 231a or the second power pin 231b under control of the processor 220 or the device recognition circuit 222. Further, the power management module 226 may transmit the second power signal (e.g., about 3.3V) to at least one of the first recognition pin 233a or the second recognition pin 233b under control of the processor 220 or the device recognition circuit 222. The first power signal (e.g., about 5V) may be a signal obtained by boosting a power signal output via a terminal of the battery (e.g., the battery 189 of FIG. 1) using a separate boosting circuit. The second power signal (e.g., about 3.3V) may be a power signal directly output via a terminal of the battery (e.g., the battery 189 in FIG. 1) while not being subjected to the boosting using a separate boost circuit.

Figure 4:
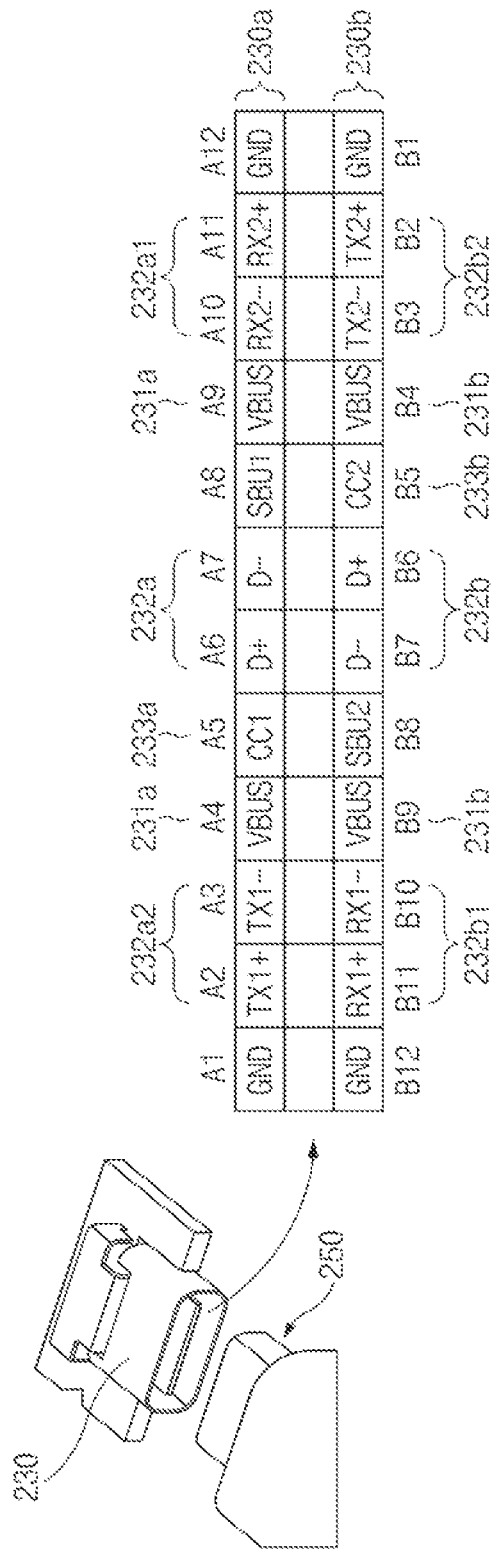
FIG. 4 shows a pin configuration of a first connector of an electronic device according to one or more embodiments.

FIG. 4 shows a pin configuration of a first connector of an electronic device according to one or more embodiments. Referring to FIG. 4, the first connector 230 may include the first sub-pin array 230a and the second sub-pin array 230b implemented in a symmetrical arrangement and position with each other. For example, the first sub-pin array 230a may include first to twelfth pins (e.g., a power pin, a ground pin, a data pin (TX, RX, D), the CC1 pin) according to the USB standard. The second sub-pin array 230b may be symmetrical with the first sub-pin array 230a in terms of a position and an arrangement, and may include 13-th to 24-th pins (e.g., a power pin, a ground pin, a data pin (TX, RX, D), the CC2 pin) according to the USB standard.

When the second connector 250 of the accessory device 202 is connected to the first connector 230 of the electronic device 201, the power pin 231a or 231b may transmit the first power signal to the accessory device 202.

For example, when the first connector 230 is connected to the second connector 250 of the accessory device 202 such that a first resistor Rd (5.1 k) is connected to the first recognition pin (e.g., a CC1 pin) 233a, the first power signal (about 5V) may be supplied via the first power pin (e.g., a VBUS pin) 231a, and a separate power signal may not be supplied via the second power pin (e.g., a VBUS pin) 231b.

In another example, when the first connector 230 is connected to the second connector 250 of the accessory device 202 such that the first resistor Rd (5.1 k) is connected to the second recognition pin (e.g., a CC2 pin) 233b, the first power signal (about 5V) may be supplied via the second power pin (e.g., a VBUS pin) 231b, and a separate power signal may not be supplied via the first power pin (e.g., a VBUS pin) 231a.

The data pins (TX, RX, D) of the first sub-pin array 230a may include a D pin 232a, an RX pair pin 231a1, and a TX pair pin 231a2. The RX pair pin 231a1 may include an RX2− pin (A10 pin) and an RX2+ pin (A11 pin). The TX pair pin 231a2 may include a TX1+ pin (A2 pin) and a TX1− pin (A3 pin). The D pin 232a may include a D+ pin (A6 pin) and a D− pin (A7 pin). The RX pair pin 231a1 and the TX pair pin 231a2 may be data pins according to USB 3.0, and the D pin 232a may be a data pin according to USB 2.0.

The data pins (TX, RX, D) of the second sub-pin array 230b may include a D pin 232b, an RX pair pin 231b1, and a TX pair pin 231b2. The RX pair pin 231b1 may include an RX1− pin (B10 pin) and an RX1+ pin (B11 pin). The TX pair pin 231b2 may include a TX2+ pin (B2 pin) and a TX2− pin (B3 pin). The D pin 232b may include a D+ pin (B6 pin) and a D− pin (B7 pin). The RX pair pin 231b1 and the TX pair pin 231b2 may be data pins according to USB 3.0, and the D pin 232b may be a data pin according to USB 2.0.

According to one or more embodiments, the data pin 232a or 232b may receive the identification information of the accessory device 202 using USB enumeration. For example, the identification information may include at least some of manufacturer identification information (Vendor ID (VID)), product identification information (Product ID (PID)), manufacturing information (Manufacture info), or product information (Product info).

According to one or more embodiments, when the identification information of the accessory device 202 received via the data pin 232a or 232b matches the stored information, the electronic device 201 may be configured to cut off the supply of the first power signal to the accessory device 202 via the power pin 231a or 231b, and to maintain the supply of the second power signal to the accessory device 202 via the recognition pin (e.g., a CC1 or a CC2 pin) 233a or 233b.

For example, when recognizing the accessory device 202 via the first recognition pin (e.g., a CC1 pin) 233a (the resistor Rd is connected thereto), the electronic device 201 may supply the first power signal (e.g., about 5V) to the first power pin 231a, and may supply the second power signal (e.g., about 3.3V) to the second recognition pin (e.g., a CC2 pin) 233b. When the identification information of the accessory device 202 received via the first data pin 232a matches the stored information, the electronic device 201 may cut off the supply of the first power signal to the accessory device 202 via the first power pin 231a, and may maintain the supply of the second power signal to the accessory device 202 via the second recognition pin (e.g., a CC2 pin) 233b.

In another example, when recognizing the accessory device 202 via the second recognition pin (e.g., a CC2 pin) 233b (the resistor Rd is connected thereto), the electronic device 201 may supply the first power signal (e.g., about 5V) to the second power pin 231b, and may supply the second power signal (e.g., about 3.3V) to the first recognition pin (e.g., a CC1 pin) 233a. When the identification information of the accessory device 202 received via the second data pin 232b matches the stored information, the electronic device 201 may cut off the supply of the first power signal to the accessory device 202 via the second power pin 231b, and may maintain the supply of the second power signal to the accessory device 202 via the first recognition pin (e.g., a CC1 pin) 233a.

According to one or more embodiments, the data pin 232a or 232b may transmit a sound signal to the accessory device 202. For example, the data pin 232a or 232b may transmit a sound signal of digital data using USB Audio Class (UAC).

The recognition pin (e.g., a CC1 or a CC2 pin) 233a or 233b may detect the connection of the accessory device 202 to the electronic device via the first connector 230. The recognition pin 233a or 233b may be a configuration channel (CC) pin according to the USB Type-C™ standard.

For example, when the first resistor Rd (5.1 k) is connected to the first recognition pin (e.g., a CC1 pin) 233a and the second recognition pin (e.g., a CC2 pin) 233b is in an open state, the first power pin (e.g., a VBUS pin) 231a may supply the first power signal (e.g., about 5V). Further, simultaneously with the supply of the first power signal (or within a specified time), the second recognition pin (e.g., a CC2 pin) 233b may supply the second power signal (e.g., about 3.3V). Thereafter, one of the first power signal and the second power signal may be blocked based on the identification of the accessory device 202.

In another example, when the first resistor Rd (5.1 k) is connected to the second recognition pin (e.g., a CC2 pin) 233b, and the first recognition pin (e.g., a CC1 pin) 233a is in an open state, the second power pin (e.g., a VBUS pin) 231b may supply the first power signal (e.g., about 5V). Further, simultaneously with the supply of the first power signal (or within a specified time), the first recognition pin (e.g., a CC1 pin) 233a may supply the second power signal (e.g., about 3.3V). Thereafter, one of the first power signal and the second power signal may be blocked based on the identification of the accessory device 202.

According to one or more embodiments, the second power signal (e.g., VCONN, about 3.3V) supplied via the recognition pin (e.g., a CC1 or CC2 pin) 233a or 233b may be blocked when the number of times of no response to a Source Capability message is equal to or larger than a specified value (30 or 50 times).

Figure 5:
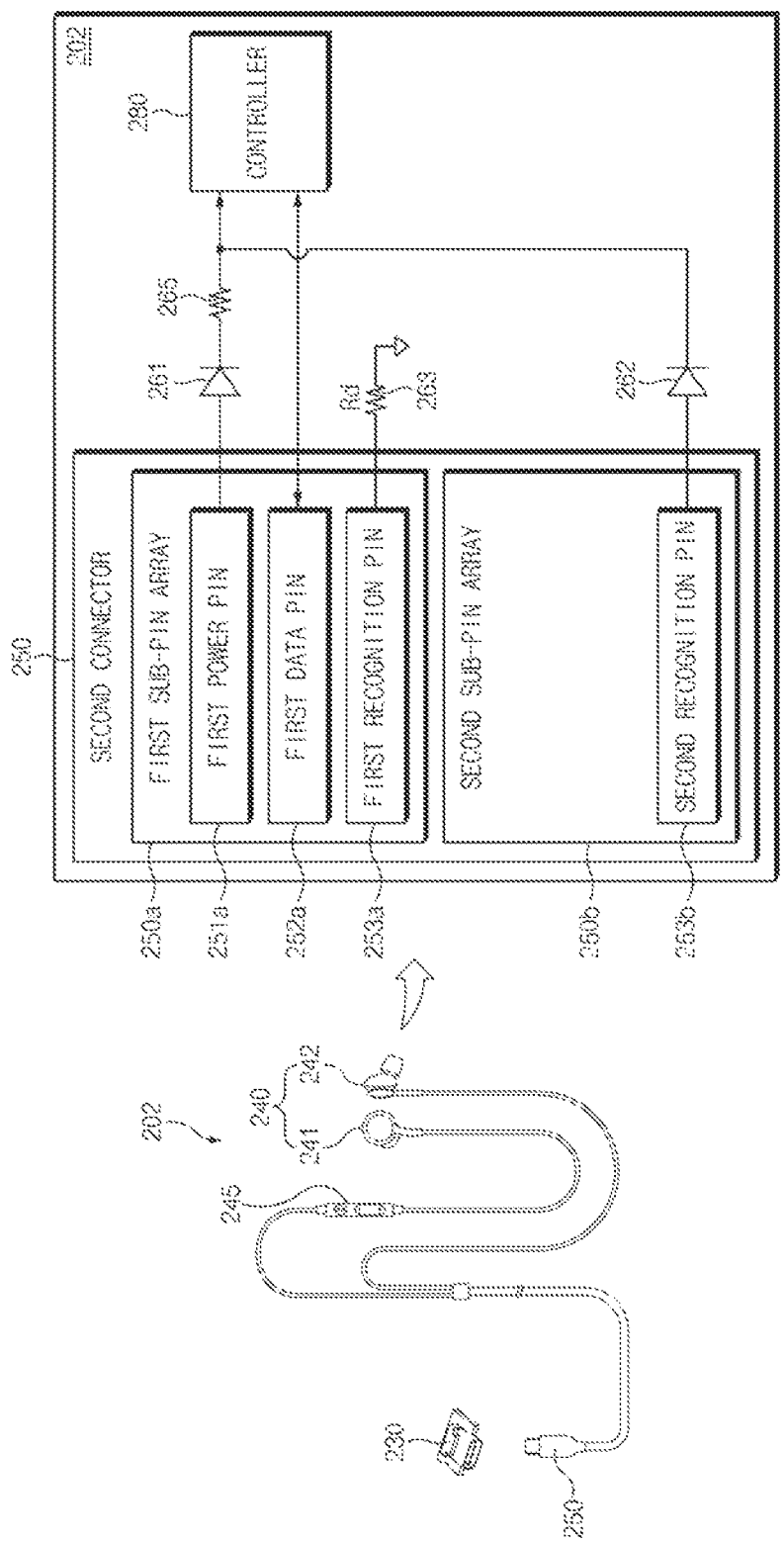
FIG. 5 is a configuration diagram of an accessory device according to one or more embodiments.

FIG. 5 is a configuration diagram of an accessory device according to one or more embodiments. Referring to FIG. 5, the accessory device 202 may include the second connector 250, a first diode 261, a second diode 262, a first resistor 263, a second resistor 265 and a controller (e.g., a codec chip) 280.

The second connector 250 may include a first sub-pin array 250a and a second sub-pin array 250b. The first sub-pin array 250a may include a first power pin (e.g., a VBUS pin) (which may be a plurality of pins) 251a, a first data pin (e.g., a D+ pin, a D− pin) (which may be a plurality of pins) 252a, and a first recognition pin (e.g., a CC1 pin) 253a.

The second sub-pin array 250b may include a second recognition pin (e.g., a CC2 pin) 253b. The power pins or data pins of the second sub-pin array 250b may be provided and in an open state so as not to be substantially connected.

According to one or more embodiments, the first recognition pin (e.g., a CC1 pin) 253a may be connected to the first resistor (Rd, 5.1 k) 263. The recognition pin (e.g., the recognition pin 233a or 233b of FIG. 3) of the first connector 230 may be connected to the first recognition pin (e.g., a CC1 pin) 253a of the second connector 250 so as to recognize the first resistor (Rd, 5.1 k) 263, the first power signal (e.g., about 5V) may be supplied via the first power pin (e.g., a VBUS pin) 251a, and the second power signal (e.g., about 3.3V) may be supplied via the second recognition pin (e.g., a CC2 pin) 253b. The first diode 261 may prevent reverse current of the first power signal, and the second diode 262 may prevent reverse current of the second power signal. The first power signal (e.g., about 5V) may be subjected to a voltage drop (e.g., a voltage drop from about 5V to about 3.3V) via the second resistor 265 and then may be supplied to the controller 280.

When USB enumeration is in progress, the controller 280 may transmit the identification information of the accessory device 202 to the electronic device 201 via the first data pin (e.g., a D+ pin, a D− pin) 252a. For example, the identification information may include at least some of manufacturer identification information (Vendor ID (VID)), product identification information (Product ID (PID)), manufacturing information (Manufacture info), or product information (Product info).

When the identification information of the accessory device 202 matches the information stored inside the electronic device 201, the supply of the first power signal (e.g., about 5V) via the first power pin (e.g., a VBUS pin) 251a may be blocked, and the supply of the second power signal (e.g., about 3.3V) via the second recognition pin (e.g., a CC2 pin) 253b may be maintained continuously.

When the identification information of the accessory device 202 does not match the information stored inside the electronic device 201, the supply of the first power signal (e.g., about 5V) via the first power pin (e.g., a VBUS pin) 251a may be continuously maintained, and the supply of the second power signal (e.g., about 3.3V) via the second recognition pin (e.g., a CC2 pin) 253b may be blocked.

According to one or more embodiments, the accessory device 202 may further include a PDIC connected to the first recognition pin (e.g., a CC1 pin) 253a. The PDIC may transmit and receive a PD (power delivery) message to and from the device recognition circuit 222 of the electronic device 101. The PD message may be a communication protocol in a BMC manner.

According to one or more embodiments, the PDIC may transmit the identification information of the accessory device 202 to the electronic device 201 via the first recognition pin (e.g., a CC1 pin) 253a. For example, the PDIC may transmit ID Header VDO.

When the identification information of the accessory device 202 is a specified value (e.g., $V_{CONN}$-Powered USB Device (VPD)), the supply of the first power signal (e.g., about 5V) via the first power pin (e.g., a VBUS pin) 251a may be blocked, and the second power signal (e.g., about 3.3V) may be supplied to the controller 280 via the second recognition pin (e.g., a CC2 pin) 253b.

The controller (e.g., a codec chip) 280 may transmit the identification information of the accessory device 202 in USB enumeration. Further, the controller (e.g., a codec chip) 280 may receive a sound signal and output the same via the sound output device 240. The controller (e.g., a codec chip) 280 may be mounted inside the control module 245.

FIG. 6A is a flow chart of a power supply method using a data pin according to one or more embodiments. Referring to FIG. 6A, in operation 610, the processor 220 or the device recognition circuit (e.g., PDIC) 222 may detect the connection of the accessory device 202 to the electronic device via the recognition pin (e.g., a CC (configuration channel) pin) 233a or 233b.

The processor 220 or the device recognition circuit (e.g., PDIC) 222 may identify whether the first resistor Rd (5.1 k) is connected to the first recognition pin 233a or the second recognition pin 233b. Hereinafter, a case in which the first resistor is connected to the first recognition pin 233a will be mainly discussed. However, the disclosure is not limited thereto.

In operation 620, when the first resistor Rd (5.1 k) is connected to the first recognition pin 233a, the processor 220 or the device recognition circuit (e.g., PDIC) 222 may control the power management module 226 to supply the first power signal (e.g., about 5V) via the first power pin 231a included in the first sub-pin array 230a including the first recognition pin 233a. For example, the first power signal (e.g., about 5V) may be a signal obtained by boosting a signal supplied from a battery using a boost circuit. Further, simultaneously with the supply of the first power signal (or within a specified time), the processor 220 or the device recognition circuit (e.g., PDIC) 222 may control the power management module 226 to supply the second power signal (e.g., about 3.3V) having a voltage lower than that of the first power signal via the second recognition pin 233b. The second power signal (e.g., about 3.3V) may be a signal provided directly from the battery of the electronic device 201 while not being subjected to the voltage boosting using a separate boost circuit.

In operation 630, the processor 120 may perform USB enumeration via the first data pin (e.g., a D+ pin, a D− pin) 232a of the first sub-pin array 230a including the first recognition pin 233a. USB enumeration may refer to a process of detecting, identifying and loading a driver for a USB device (see FIG. 6B).

In operation 640, the processor 120 may receive first identification information of the accessory device 202 based on the USB enumeration. For example, the first identification information of the accessory device 202 may include at least some of manufacturer identification information (Vendor ID (VID)), product identification information (Product ID (PID)), manufacturing information (Manufacture info), or product information (Product info). The processor 120 may receive the first identification information via the first data pin (e.g., a D+ pin, a D− pin) 232a.

According to one or more embodiments, the accessory device 202 may be configured not to include a PDIC for PD communication. In this case, the processor 120 may not be able to receive the identification information of the accessory device 202 via the recognition pins 233a and 233b, and may receive the first identification information of the accessory device 202 based on the USB enumeration using the data pin (e.g., a D+ pin, a D− pin) 232a or 232b.

In operation 650, the processor 120 may identify whether the first identification information matches second identification information stored inside the electronic device 201. For example, the processor 120 may identify whether the accessory device 202 is manufactured by the same manufacturer as the manufacturer of the electronic device 201. In another example, the process 120 may identify whether the accessory device 202 is manufactured by a company pre-agreed with the manufacturer of the electronic device 201.

In operation 660, when the first identification information and the second identification information match each other, the processor 220 or the device recognition circuit (e.g., PDIC) 222 may control the power management module 226 to cut off the supply the first power signal (e.g., about 5V) via the first power pin 231a, and to maintain the supply of the second power signal (e.g., about 3.3V) via the second recognition pin 233b. Thus, current consumed due to the connection of the accessory device 202 to the electronic device may be reduced.

According to one or more embodiments, when the first identification information and the second identification information match each other, the processor 120 may identify whether the accessory device 202 is connected to the electronic device via a hub device. When the accessory device 202 is connected to the electronic device via the hub device, the processor 120 may control the power management module 226 to maintain the supply of the first power signal (e.g., about 5V) via the first power pin 231a, and to cut off the supply of the second power signal (e.g., about 3.3V) via the second recognition pin 233b. Thus, a power supply state to an external device connected to the electronic device via the hub device may be maintained at the first power signal (e.g., about 5V).

In operation 670, when the first identification information and the second identification information do not match each other, the processor 220 or the device recognition circuit (e.g., PDIC) 222 may control the power management module 226 to maintain the supply of the first power signal (e.g., about 5V) via the first power pin 231a, and to cut off the supply of the second power signal (e.g., about 3.3V) via the second recognition pin 233b.

Figure 6B:
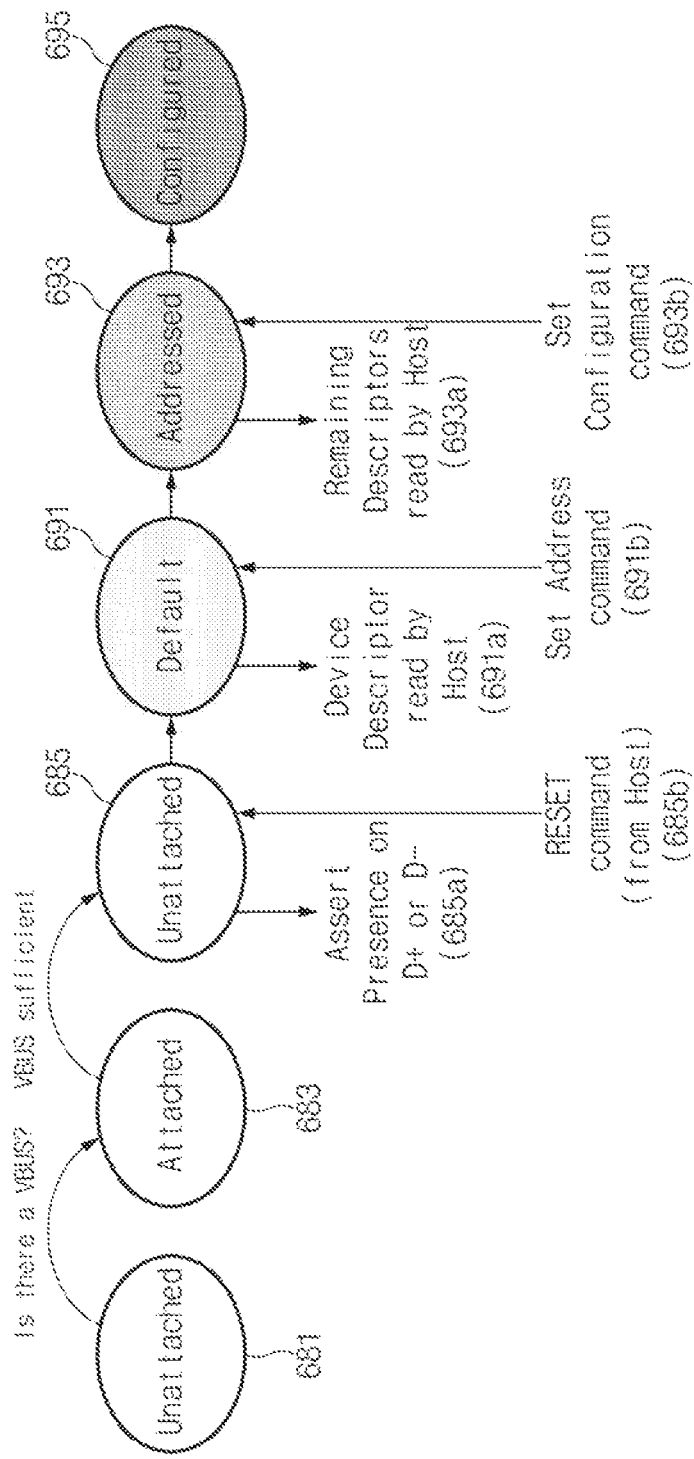
FIG. 6B shows USB enumeration in an accessory device according to one or more embodiments.

FIG. 6B shows USB enumeration in an accessory device according to one or more embodiments. Referring to FIG. 6B, in an unattached state 681, the second connector 250 of the accessory device 202 may not be connected to the first connector 230 of the electronic device 201.

The accessory device 202 (or the controller 280 of the accessory device 202) may identify whether the first power signal (e.g., VBUS) is supplied to the first power pin (VBUS pin) 251a. When the first power signal is supplied to the first power pin (VBUS pin) 251a, the accessory device 202 may be brought into an attached state 683.

In the attached state 683, the accessory device 202 may identify whether the first power signal (e.g., VBUS) is greater than or equal to a specified voltage value (e.g., 5V). When the first power signal is greater than or equal to a specified voltage value (e.g., 5V), the accessory device 202 may be brought into a power supply state 685.

In the power supply state 685, the accessory device 202 may transmit a signal indicating availability of the first data pin 252a to the electronic device 201 as a host device (685a). The accessory device 202 may receive a reset command from the electronic device 201 as the host device via the first data pin 252a (685b). The accessory device 202 may perform a device reset in response to the reset command. When the device reset is completed, the accessory device 202 may be brought into a default state 691.

In the default state 691, the accessory device 202 may transmit a device descriptor to the electronic device 201 as the host device (691a). According to one or more embodiments, the device descriptor may include the identification information of the accessory device 202. For example, the identification information of the accessory device 202 may include at least some of manufacturer identification information (Vendor ID (VID)), product identification information (Product ID (PID)), manufacturing information (Manufacture info), or product information (Product info). The accessory device 202 may receive an address command from the electronic device 201 as the host device (691b) and may be brought into an addressed state 693.

According to one or more embodiments, when the identification information of the accessory device 202 matches the identification information stored inside the electronic device 201, the electronic device 201 may cut off the supply of the first power signal (e.g., about 5V) via the first power pin 231a of the first connector 230, and may maintain the supply of the second power signal (e.g., about 3.3V) via the second recognition pin 233b of the first connector 230. Thus, current consumed due to the connection of the accessory device 202 to the electronic device may be reduced.

In the addressed state 693, the accessory device 202 may transmit an additional device descriptor to the electronic device 201 as the host device (693a). The accessory device 202 may receive a configuration command (693b) and may be brought into a configured state 695.

In the configured state 695, the accessory device 202 may output a sound signal transmitted from the electronic device 201 as the host device as a sound through a speaker.

FIG. 7 is a flowchart of a power supply method using PD communication according to one or more embodiments. Referring to FIG. 7, in operation 710, the processor 220 or the device recognition circuit (e.g., PDIC) 222 may detect the connection of the accessory device 202 to the electronic device via the recognition pin (e.g., a configuration channel (CC) pin) 233a or 233b.

The processor 220 or the device recognition circuit (e.g., PDIC) 222 may identify whether the first resistor Rd (5.1 k) is connected to the first recognition pin 233a or the second recognition pin 233b. Hereinafter, a case in which the first resistor is connected to the first recognition pin 233a will be mainly discussed. However, the disclosure is not limited thereto. Further, at least some of operations of the processor 220 may be performed by the device recognition circuit (e.g., PDIC) 222.

In operation 720, when the first resistor Rd (5.1 k) is connected to the first recognition pin (233a), the processor 220 or the device recognition circuit (e.g., PDIC) 222 may control the power management module 226 to supply the first power signal (e.g., about 5V) via the first power pin 231a included in the first sub-pin array 230a including the first recognition pin 233a. For example, the first power signal (e.g., about 5V) may be a signal obtained by boosting a signal supplied from a battery using a boost circuit. Further, simultaneously with the supply of the first power signal (or within a specified time), the processor 220 or the device recognition circuit (e.g., PDIC) 222 may control the power management module 226 to supply the second power signal (e.g., about 3.3V) having a lower voltage than that of the first power signal via the second recognition pin 233b. The second power signal (e.g., about 3.3V) may be a signal provided directly from the battery of the electronic device 201 while not being subjected to a voltage boosting using a separate boost circuit.

In operation 730, the processor 220 or the device recognition circuit (e.g., PDIC) 222 may identify whether PD communication using the first recognition pin 233a of the first connector 230 is available. When the accessory device 202 includes a PDIC connected to the first recognition pin (e.g., a CC1 pin) 253a of the second connector 250, the PD communication may be available. The power delivery (PD) message may be a communication protocol in the BMC manner.

In operation 740, when PD communication is available, the processor 220 or the device recognition circuit (e.g., PDIC) 222 may receive the first identification information of the accessory device 202 via the first recognition pin 233a of the first connector 230. For example, the first identification information may be an ID Header VDO (Vendor Define Object).

In operation 750, the processor 220 or the device recognition circuit (e.g., PDIC) 222 may identify whether the first identification information is a specified value. For example, the processor 220 or the device recognition circuit (e.g., PDIC) 222 may identify whether a Vendor Define Object (VDO) is a $V_{CONN}$-Powered USB Device (VPD).

In operation 760, when the first identification information is the specified value, the processor 220 or the device recognition circuit (e.g., PDIC) 222 may control the power management module 226 to cut off the supply of the first power signal (e.g., about 5V) via the first power pin 231a, and to maintain the supply of the second power signal (e.g., about 3.3V) via the second recognition pin 233b. Thus, current consumed due to the connection of the accessory device 202 to the electronic device may be reduced.

In operation 770, when the PD communication is not available or when the first identification information is not the specified value, the processor 220 or the device recognition circuit (e.g., PDIC) 222 may control the power management module 226 to maintain the supply of the first power signal (e.g., about 5V) via the first power pin 231a, and to cut off the supply of the second power signal (e.g., about 3.3V) via the second recognition pin 233b.

According to one or more embodiments, the processor 220 or the device recognition circuit (e.g., PDIC) 222 may receive the manufacturer identification information (Vendor ID (VID)) or product identification information (Product ID (PID)) of the accessory device 202 via the first recognition pin 233a of the first connector 230. In this case, before the USB enumeration is performed, the processor 220 or the device recognition circuit (e.g., PDIC) 222 may cut off the supply of the first power signal (e.g., about 5V) via the first power pin 231a, and may maintain the supply of the second power signal (e.g., about 3.3V) via the second recognition pin 233b.

Figure 8:
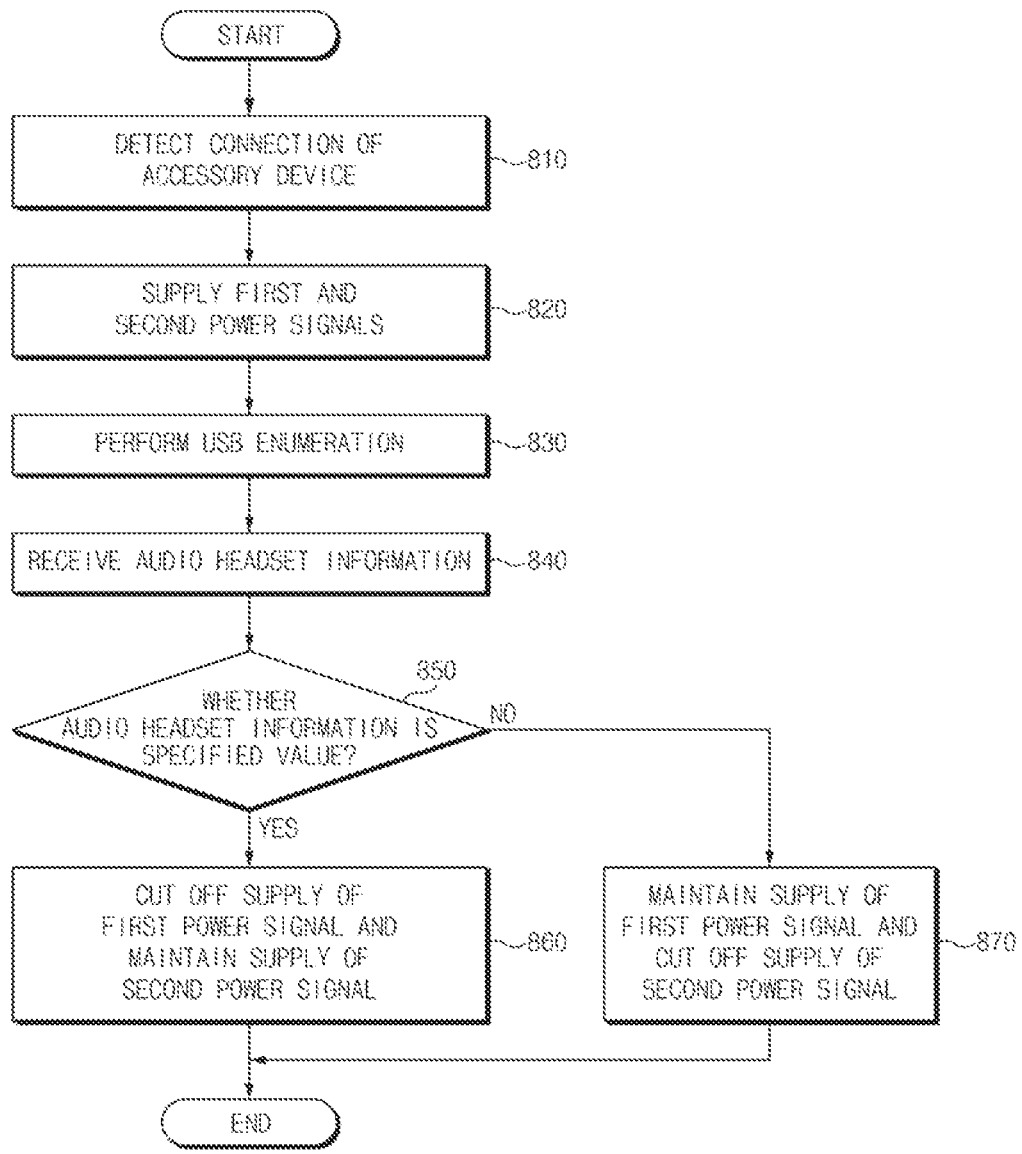
FIG. 8 is a flowchart of a power supply method using audio headset information according to one or more embodiments.

FIG. 8 is a flowchart of a power supply method using audio headset information according to one or more embodiments. Referring to FIG. 8, in operation 810, the processor 220 or the device recognition circuit (e.g., PDIC) 222 may detect the connection of the accessory device 202 to the electronic device via the recognition pin (e.g., a CC (configuration channel) pin) 233a or 233b.

The processor 220 or the device recognition circuit (e.g., PDIC) 222 may identify whether the first resistor Rd (5.1 k) is connected to the first recognition pin 233a or the second recognition pin 233b. Hereinafter, a case in which the first resistor is connected to the first recognition pin 233a will be mainly discussed. However, the disclosure is not limited thereto.

In operation 820, when the first resistor Rd (5.1 k) is connected to the first recognition pin (233a), the processor 220 or the device recognition circuit (e.g., PDIC) 222 may control the power management module 226 to supply the first power signal (e.g., about 5V) via the first power pin 231a included in the first sub-pin array 230a including the first recognition pin 233a. For example, the first power signal (e.g., about 5V) may be a signal obtained by boosting a signal supplied from a battery via a boost circuit. Further, simultaneously with the supply of the first power signal (or within a specified time), the processor 220 or the device recognition circuit (e.g., PDIC) 222 may control the power management module 226 to supply the second power signal (e.g., about 3.3V) having a lower voltage than that of the first power signal via the second recognition pin 233b. The second power signal (e.g., about 3.3V) may be a signal provided directly from the battery of the electronic device 201 while not being subjected to a voltage boosting using a separate boost circuit.

In operation 830, the processor 120 may perform USB enumeration via the first data pin (e.g., a D+ pin, a D− pin) 232a of the first sub-pin array 230a including the first recognition pin 233a. USB enumeration may refer to a process of detecting, identifying and loading a driver for a USB device.

In operation 840, when the accessory device 202 is an audio class device, the processor 120 may receive audio headset information of the accessory device 202 based on the USB enumeration. For example, the audio headset information may be an Audio Control Interface Descriptor.

In operation 850, the processor 120 may identify whether the audio headset information is a specified value. For example, it may be identified whether the Audio Function Category Codes included in the Category Field of the Audio Control Interface Descriptor is HEADSET.

In operation 860, when the audio headset information is the specified value, the processor 220 or the device recognition circuit (e.g., PDIC) 222 may control the power management module 226 to cut off the supply of the first power signal (e.g., about 5V) via the first power pin 231a, and to maintain the supply of the second power signal (e.g., about 3.3V) via the second recognition pin 233b. Thus, current consumed due to the connection of the accessory device 202 to the electronic device may be reduced.

According to one or more embodiments, when the audio headset information is the specified value, the processor 120 may identify whether the accessory device 202 is connected to the electronic device via a hub device. When the accessory device 202 is connected thereto via the hub device, the processor 120 may control the power management module 226 to maintain the supply of the first power signal (e.g., about 5V) via the first power pin 231a, and to cut off the supply of the second power signal (e.g., about 3.3V) via the second recognition pin 233b. Thus, a power supply state to an external device connected to the electronic device via the hub device may be maintained at the first power signal (e.g., about 5V).

In operation 870, when the audio headset information is not the specified value, the processor 220 or the device recognition circuit (e.g., PDIC) 222 may control the power management module 226 to maintain the supply of the first power signal (e.g., about 5V) via the first power pin 231a, and to cut off the supply of the second power signal (e.g., about 3.3V) via the second recognition pin 233b.

Figure 9:
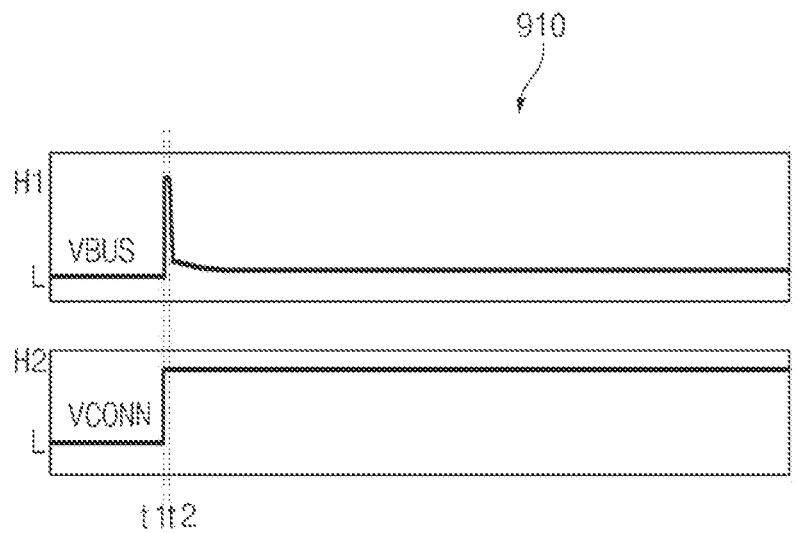
FIG. 9 is a graph of change in a first power signal or a second power signal according to one or more embodiments.
Figure 9:
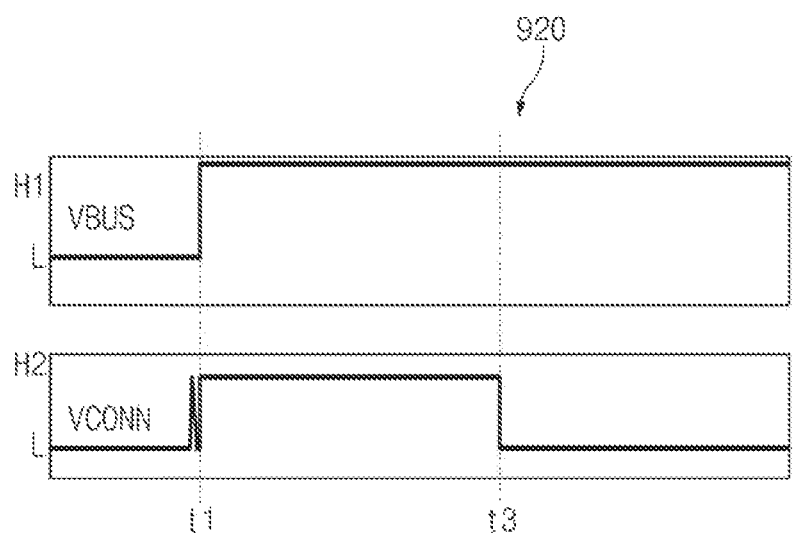

FIG. 9 is a graph of change in a first power signal or a second power signal according to one or more embodiments. Referring to FIG. 9, when the second connector 250 of the accessory device 202 is not connected to the first connector 230, both the first power signal (VBUS) and the second power signal (VCONN) may be in a L state (e.g., about 0V) (before t1).

At time t1 when the first resistor Rd (5.1 k) is connected to the first recognition pin 233a, the processor 220 or the device recognition circuit (e.g., PDIC) 222 may change the first power signal (VBUS) supplied via the first power pin 231a included in the first sub-pin array 230a including the first recognition pin 233a to a H1 state (e.g., about 5V), and may change the second power signal (VCONN) supplied via the second recognition pin 233b to a H2 state (e.g., about 3.3V).

In a first graph 910, when the identification information of the accessory device 202 is a specified value or matches the information stored in the electronic device 201 (time t2), the processor 220 or the device recognition circuit (e.g., PDIC) 222 may change a state of the first power signal (VBUS) from the H1 state (e.g., about 5V) to the L state (e.g., about 0V), and may maintain a state of the second power signal (VCONN) at the H2 state (e.g., about 3.3V).

In a second graph 920, when the identification information of the accessory device 202 is not the specified value or does not match the information stored in the electronic device 201 (time t3), the processor 220 or the device recognition circuit (e.g., PDIC) 222 may maintain a state of the first power signal (VBUS) at the H1 state (e.g., about 5V), and may change a state of the second power signal (VCONN) from the H2 state (e.g., about 3.3V) to the L state (e.g., about 0V).

According to one embodiment, when the number of times of no response to a Source Capability message is equal to or larger than a specified value (e.g., 50 times), the processor 220 or the device recognition circuit (e.g., PDIC) 222 may change a stage of the second power signal (VCONN) from the H2 state (e.g., about 3.3V) to the L state (e.g., about 0V).

An electronic device (e.g., the electronic device 101 of FIG. 1, the electronic device 201 of FIG. 2) according to one or more embodiments may include a housing, a battery disposed inside the housing, a power management module (e.g., the power management module 188 in FIG. 1, the power management module 226 in FIG. 3) for controlling supply of power from the battery, a connector (e.g., the first connector 230 in FIG. 2) disposed inside the housing, a device recognition circuit (e.g., the device recognition circuit 222 in FIG. 3) for detecting a connected state of the connector (e.g., the first connector 230 in FIG. 2), a memory, and a processor electrically connected to the memory, the power management module (e.g., the power management module 188 in FIG. 1, the power management module 226 in FIG. 3) or the device recognition circuit (e.g., the device recognition circuit 222 in FIG. 3), wherein the connector (e.g., the first connector 230 in FIG. 2) includes a first sub-pin array and a second sub-pin array arranged symmetrically with the first sub-pin array, wherein the first sub-pin array includes a first power pin, a first data pin, and a first recognition pin, wherein the second sub-pin array includes a second power pin, a second data pin, and a second recognition pin, wherein the first recognition pin and the second recognition pin are connected to the device recognition circuit (e.g., the device recognition circuit 222 in FIG. 3), wherein the processor or the device recognition circuit (e.g., the device recognition circuit 222 of FIG. 3) is configured to, when an external accessory device is connected to the connector (e.g., the first connector 230 of FIG. 2) and a specified resistance value is detected in the first recognition pin, control the power management module to supply a first power signal to the first power pin and a second power signal to the second recognition pin, receive first identification information of the accessory device via the first recognition pin or the first data pin, and when the first identification information is a specified value or matches second identification information stored in the memory, control the power management module to cut off the supply of the first power signal and to maintain the supply of the second power signal.

According to one or more embodiments, the processor may be configured to perform USB enumeration using the first data pin to receive the first identification information.

According to one or more embodiments, the first identification information may include manufacturer information or product information of the accessory device.

According to one or more embodiments, the memory may store therein a list of the second identification information.

According to one or more embodiments, the processor may be configured to receive the first identification information using the first data pin in a default state of the USB enumeration.

According to one or more embodiments, the processor may be configured to receive audio headset information using the first data pin.

According to one or more embodiments, the processor may be configured to, when the audio headset information may be a specified code, control the power management module to cut off the supply of the first power signal and to maintain the supply of the second power signal.

According to one or more embodiments, the processor may be configured to, when the accessory device may be recognized as being connected to the connector (e.g., the first connector 230 of FIG. 2) via a separate hub device, control the power management module to maintain the supply of the first power signal and cut off the supply of the second power signal.

According to one or more embodiments, the processor may be configured to transmit a sound signal to the accessory device via the first data pin.

According to one or more embodiments, the device recognition circuit (e.g., the device recognition circuit 222 of FIG. 3) may be configured to receive the first identification information via the first recognition pin, and based on a message by power delivery (PD) communication.

According to one or more embodiments, the specified value may be a code set in a device operable based on the second power signal.

According to one or more embodiments, the first power signal may have a higher voltage value than a voltage value of the second power signal.

According to one or more embodiments, the connector may be a receptacle (e.g., the first connector 230 of FIG. 2) for a USB Type-C.

An accessory device (e.g., the accessory device 202 in FIG. 2) according to one or more embodiments may be wiredly connected to an external device (e.g., the electronic device 101 in FIG. 1, the electronic device 201 in FIG. 2) and may include a controller (e.g. the controller 280 in FIG. 5), and a connector (e.g., the second connector 250 in FIG. 2) connected to the external device (e.g., the electronic device 101 in FIG. 1, the electronic device 201 in FIG. 2), wherein the connector (e.g., the second connector 250 in FIG. 2) includes a first sub-pin array and a second sub-pin array arranged symmetrically with the first sub-pin array, wherein the first sub-pin array includes a first power pin, a first data pin, and a first recognition pin, wherein the first recognition pin is connected to a first resistor, wherein the second sub-pin array includes a second recognition pin, wherein the controller (e.g., the controller 280 of FIG. 5) may receive a first power signal via the first power pin or may receive a second power signal via the second recognition pin.

According to one or more embodiments, the controller (e.g., the controller 280 of FIG. 5) may transmit manufacturer information or product information of the accessory device via the first data pin.

According to one or more embodiments, the first power signal may be subjected to voltage-drop due to a second resistor and then may be supplied to the controller (e.g., the controller 280 of FIG. 5).

A method for supplying power to an accessory device (e.g., the accessory device 202 of FIG. 2) according to one or more embodiments may be performed by an electronic device (e.g., the electronic device 101 in FIG. 1, the electronic device 201 in FIG. 2), and may include detecting a specified resistance value of the accessory device (e.g., the accessory device 202 in FIG. 2) connected to the electronic device via a first recognition pin of a first sub-pin array of a connector (e.g., the first connector 230 in FIG. 2) of the electronic device (e.g., the electronic device 101 in FIG. 1, the electronic device 201 in FIG. 2), supplying a first power signal to a first power pin of the first sub-pin array and supplying a second power signal to a second recognition pin of a second sub-pin array of the connector (e.g., the first connector 230 in FIG. 2), receiving first identification information of the accessory device (e.g., the accessory device 202 in FIG. 2) via a first data pin of the first sub-pin array, determining whether the first identification information matches second identification information stored in a memory of the electronic device (e.g., the electronic device 101 in FIG. 1, the electronic device 201 in FIG. 2), and upon determination that the first identification information and the second identification information match each other, cutting off the supply of the first power signal and maintaining the supply of the second power signal.

According to one or more embodiments, the receiving of the first identification information may include performing USB enumeration.

A method for supplying power to an accessory device (e.g., the accessory device 202 of FIG. 2) according to one or more embodiments may be performed in an electronic device (e.g., the electronic device 101 in FIG. 1, the electronic device 201 in FIG. 2), and may include detecting a specified resistance value of the accessory device (e.g., the accessory device 202 in FIG. 2) connected to the electronic device via a first recognition pin of a first sub-pin array of a connector (e.g., the first connector 230 in FIG. 2) of the electronic device (e.g., the electronic device 101 in FIG. 1, the electronic device 201 in FIG. 2), supplying a first power signal to a first power pin of the first sub-pin array and supplying a second power signal to a second recognition pin of a second sub-pin array of the connector (e.g., the first connector 230 in FIG. 2), receiving first identification information of the accessory device (e.g., the accessory device 202 in FIG. 2) via the first recognition pin, and when the first identification information is a specified value, cutting off the supply of the first power signal and maintaining the supply of the second power signal.

A method for supplying power to an accessory device (e.g., the accessory device 202 of FIG. 2) according to one or more embodiments may be performed in an electronic device (e.g., the electronic device 101 in FIG. 1, the electronic device 201 in FIG. 2), and may include detecting a specified resistance value of the accessory device (e.g., the accessory device 202 in FIG. 2) connected to the electronic device via a first recognition pin of a first sub-pin array of a connector (e.g., the first connector 230 in FIG. 2) of the electronic device (e.g., the electronic device 101 in FIG. 1, the electronic device 201 in FIG. 2), supplying a first power signal to a first power pin of the first sub-pin array and supplying a second power signal to a second recognition pin of a second sub-pin array of the connector (e.g., the first connector 230 in FIG. 2), receiving audio headset information of the accessory device (e.g., the accessory device 202 in FIG. 2) via a first data pin of the first sub-pin array, and when the audio headset information is a specified value, cutting off the supply of the first power signal and maintaining the supply of the second power signal.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a power management integrated circuit configured to control a supply of a first power signal and a supply of a second power signal;
a connector comprising a first sub-pin array and a second sub-pin array;
a device recognition circuit configured to detect whether an external device is connected to the connector; and
a processor, wherein the first sub-pin array comprises a first power pin, a first data pin, and a first recognition pin,
wherein the second sub-pin array comprises a second power pin, a second data pin, and a second recognition pin;
wherein the first recognition pin and the second recognition pin are connected to the device recognition circuit;
wherein the processor is configured to:
based on a first resistance value detected in the first recognition pin, control the power management integrated circuit to supply the first power signal to the first power pin and to supply the second power signal to the second recognition pin,
perform Universal Serial Bus (USB) enumeration by using the first data pin to receive first identification information of the external device via the first recognition pin or the first data pin, and
identify whether the first identification information matches second identification information stored in a memory of the electronic device,
when the first identification information matches the second identification information, control the power management integrated circuit to cut off the supply of the first power signal and to maintain the supply of the second power signal,
wherein the first power signal is a signal obtained by boosting a power signal output via a terminal of the battery, and the second power signal is a power signal directly output via the terminal of the battery, and wherein the first identification information comprises manufacturer information or product information of the external device.

2. The electronic device of claim 1, wherein the second sub-pin array is arranged symmetrically with the first sub-pin array.

3. The electronic device of claim 1, wherein the first resistance value indicates that the external device is connected to the connector.

4. The electronic device of claim 1, wherein the memory stores a list of the second identification information.

5. The electronic device of claim 1, wherein the processor is further configured to receive the first identification information by using the first data pin in a default state of the USB enumeration.

6. The electronic device of claim 1, wherein the processor is further configured to receive information on an audio headset by using the first data pin.

7. The electronic device of claim 6, wherein the processor is further configured to, based on the information on the audio headset, control the power management integrated circuit to cut off the supply of the first power signal and to maintain the supply of the second power signal.

8. The electronic device of claim 1, wherein the processor is configured to, based on a detection that the external device is connected to the connector via a separate hub device, control the power management integrated circuit to maintain the supply of the first power signal and cut off the supply of the second power signal.

9. The electronic device of claim 1, wherein the processor is further configured to transmit a sound signal to the external device via the first data pin.

10. The electronic device of claim 1, wherein the device recognition circuit is further configured to receive the first identification information via the first recognition pin, based on a message by power delivery (PD) communication.

11. The electronic device of claim 10, wherein the first identification information is a code set in the electronic device operable based on the second power signal.

12. The electronic device of claim 1, wherein a first voltage value of the first power signal is higher than a second voltage value of the second power signal.

13. The electronic device of claim 1, wherein the connector is a receptacle for a Universal Serial Bus (USB) Type-C.

14. A method for supplying power from an electronic device to an external device, the method comprising:
detecting a first resistance value of the external device connected via a first recognition pin of a first sub-pin array of a connector of the electronic device;
supplying a first power signal to a first power pin of the first sub-pin array and supplying a second power signal to a second recognition pin of a second sub-pin array of the connector;
receiving first identification information of the external device via a first data pin of the first sub-pin array by performing Universal Serial Bus (USB) enumeration;
determining whether the first identification information matches second identification information stored in a memory of the electronic device; and
based on a determination that the first identification information and the second identification information match, cutting off a supply of the first power signal and maintaining a supply of the second power signal,
wherein the first power signal is a signal obtained by boosting a power signal output via a terminal of a battery of the electronic device, and the second power signal is a power signal directly output via the terminal of the battery, and
wherein the first identification information comprises manufacturer information or product information of the external device.

15. An electronic device comprising:
a power management integrated circuit configured to control a supply of a first power signal and a supply of a second power signal;
a connector; and
a processor,
wherein the processor is configured to:
based on a first resistance value detected in the connector, control the power management integrated circuit to supply the first power signal to the connector and to supply the second power signal to the connector,
perform Universal Serial Bus (USB) enumeration by using a first data pin of the connector to receive first identification information of an external device, and
identify whether the first identification information matches second identification information stored a memory of the electronic device,
when the first identification information matches the second identification information, control the power management integrated circuit to cut off the supply of the first power signal and to maintain the supply of the second power signal,
wherein the first power signal is a signal obtained by boosting a power signal output via a terminal of the battery, and the second power signal is a power signal directly output via the terminal of the battery, and
wherein the first identification information comprises manufacturer information or product information of the external device.

* * * * *